United States Patent [19]
Kirwan et al.

[11] 3,849,254
[45] Nov. 19, 1974

[54] PROCESS FOR EFFECTING ENZYMATIC REACTIONS IN AEROSOLS

[75] Inventors: Donald J. Kirwan; John L. Gainer, both of Charlottesville, Va.

[73] Assignee: The University of Virginia, Charlottesville, Va.

[22] Filed: May 31, 1973

[21] Appl. No.: 365,637

[52] U.S. Cl.................. 195/116, 195/63, 195/68, 195/DIG. 11, 195/104, 195/121
[51] Int. Cl........................... C12b 1/00, C07g 7/02
[58] Field of Search ............ 195/104, 121, 68, 107, 195/116; 424/89, 94, 78, 43

[56] References Cited
UNITED STATES PATENTS

| | | | |
|---|---|---|---|
| 3,131,131 | 4/1964 | Wehner | 195/104 X |
| 3,519,538 | 7/1970 | Messing et al. | 195/68 X |
| 3,705,084 | 12/1972 | Reynolds | 195/68 X |

*Primary Examiner*—David M. Naff
*Attorney, Agent, or Firm*—Norman F. Oblon

[57] ABSTRACT

Enzyme reactions are carried out by passing an aerosol containing an enzymatic substrate such as airborne pathogens through an enzyme reactor containing an immobilized enzyme.

9 Claims, No Drawings

3,849,254

PROCESS FOR EFFECTING ENZYMATIC REACTIONS IN AEROSOLS

BACKGROUND OF THE INVENTION

1. Field of the Invention:

This invention relates generally to a method for effecting enzymatic reactions using substrates in aerosol form. In one embodiment, this invention relates to a method of inactivating pathogens in an aerosol form by enzymatic reaction. In another embodiment, this invention relates to techniques of effecting chemical reactions by contacting a chemical reactant in an aerosol form with an immobilized enzyme.

2. Description of the Prior Art:

The concept of immobilizing enzymes onto water insoluble carriers is now well established in the art, and the prior art is replete with disclosures of various techniques of immobilizing enzymes, see for instance Kay, *Process Biochemistry*, August 1968, pages 36+ for a general discussion. See also O. Zaborsky "Immobilizing Enzymes" Chemical Rubber Company, 1973. In all of the prior art disclosures, however, the enzymatic reactions using the immobilized enzymes have been effected in an aqueous medium. One might speculate that the reason for this self-imposed art limitation was that the development of immobilized enzymes followed as an extension of the earlier enzyme research which usually took the form of having free enzymes act on enzymatically reactable substrates in aqueous media. Regardless of the reason, the art clearly showed a prejudice for effecting enzymatic reactions in aqueous media, except for an occasional disclosure which related to enzymatic reactions being conducted in other liquid phase environments.

The realization that enzymatic reactions can be effected when the substrates are in forms other than continuous liquid phases, such as aerosols or atomized forms has not heretofore been studied or reported. The ability to effect an enzymatic reaction when the substrates are in such form, however, would open new prospects for commercial and industrial uses which have not been heretofore practical.

One potential application for such enzymatic reactions would be in the inactivation of airborne or other gasborne pathogens, such as deleterious and harmful bacteria, viruses, or other microorganisms. Current commercially available systems usually operate on the principle of removing dust particles from the air, on the theory that removal of the dust particles will also be effective for the removal of air viruses, bacteria or the like pathogens which tend to cling to, or otherwise be associated with, dust particles.

The usual method of removing dust from the air, of course, has been by the use of air filters which are intended to entrap the particles as they impinge upon suitably coated filaments in the filter. When the coated surfaces of the filaments become saturated with dust, the filter's effectiveness decreases. Moreover, the dirty filter itself can become a breeding ground and source of pathogen contamination. Various antiseptics have been used in conjunction with the air filters, but it often is difficult to determine the period of effectiveness of such antiseptics. Moreover, the antiseptics themselves frequently impart a noxious or unpleasant odor to the atmosphere.

An enzyme system, on the other hand, could act on such airborne or otherwise gasborne pathogens in an aerosol form, regardless of their association or lack of association with dust particles. Moreover, by properly combining various enzymes into a particular system, a very wide selection of different types of pathogens can be removed, often simultaneously.

Still another application for enzymatic reactions, wherein the substrates are in an aerosol or atomized form is in the field of chemical synthesis, wherein the reactants exhibit a greater degree of stability in a gaseous state than in the liquid state. Chemical catalysis, which is often used for such synthesis as distinguished from enzymatic catalysis, does not provide the same degree of flexibility and often requires the additional application of heat, which is either not required, or only required to a lesser degree, by enzymatic catalysis.

Accordingly, a need exists in the art for a technique for effecting enzymatic reactions, wherein the substrate is in an aerosol or atomized form.

SUMMARY OF THE INVENTION

Accordingly, it is one object of this invention to effect enzymatic reactions wherein the substrate is in an aerosol or atomized form, and in particular wherein the aerosol-substrate is an air aerosol.

It is a further object of this invention to inactivate airborne pathogens which are in an aerosol form, by effecting airborne enzymatic reaction of said pathogens with immobilized enzymes.

These and other objects as will hereinafter become more readily apparent have been effected by the discovery that an immobilized enzyme can be used for effecting an enzymatic reaction wherein the substrate is in an aerosol or atomized form, wherein the particle size of the aerosol is from 0.002 – 5 microns. In a preferred embodiment of this invention, immobilized enzymes are used to effect an inactivation of pathogens, wherein the pathogens are carried in an aerosol in such gaseous medium as air. In another preferred embodiment, the substrate is a chemical reactant which is synthesized by enzymatic catalysis by contact of the reactant in an aerosol or atomized form with an immobilized enzyme.

DETAILED DESCRIPTION OF THE PREFERRED EMBODIMENTS

Any of a wide variety of immobilized enzymes as are commonly used and disclosed in the prior art, may be used in the present invention. For instance the enzymes of the invention may be immobilized by conventional techniques such as covalent bonding of the enzymes onto various polymeric substrates, including polyacrylates, cellulose (see U.S. Pat. No. 3,278,392), polypeptides (see U.S. Pat No. 3,167,485) or the like. The enzymes may also be immobilized by adsorption onto various clays, or the like, or by cross-linking of the enzymes onto various substrates, or by entrapment in such substrates as synthetic polymer membranes such as those prepared from polyacrylates, polyamides, cellulose acetate, or the like. See for instance "Biochemical Aspects of Reactions on Solid Supports" G.R. Stark Academic Press, 1971 New York & London.

One particularly good system are those immobilized enzymes in which the enzymes are chemically bound to ceramic substrates or fiberglas substrates. Reference is here made to the immobilized enzyme systems of Weetall, *Biotechnical Bio Eng Symp*, 1972, No. 3,241,266 and Science Vol 166, 1969, 615-617, for immobilized enzyme systems which are particularly attractive for use in aerosol or atomized systems. Another immobilized enzyme system which can be used for effecting airborne enzymatic reactions is that disclosed in Messing, et al., U.S. Pat. No. 3,510,538 which covalently couples an enzyme via silane coupling agents to a siliceous carrier. Also carriers such as nickel oxide, aluminum oxide clays or the like are attractive. Such systems have been prepared in the form of open mesh or web form, through which the enzymatically active substrate can be passed. Another particularly commercially attractive system are the enzymes immobilized onto cellulosic webs, such as cotton, which can be used in the form of a surgical mask, in accordance with the methods of this invention.

The actual structure of the immobilized enzyme is not particularly critical and any of the very many forms can be used. The above discussion is only exemplary of those forms which would be suitable.

The present invention is concerned with the discovery that enzymatic reactions can be effected in a aerosol form in the presence of an immobilized enzyme. Heretofore, it was believed that such reactions required a continuous liquid phase medium, and preferably an aqueous substrate. Contrary to past beliefs, it has now been discovered that enzymatic reactions will proceed at a significantly faster rate, than the same reaction in a continuous liquid medium. A wide variety of carriers can be used for immobilizing the enzymes. For instance, suitable carriers include siliceous material such as glass, fiberglas, ceramic, colloidal silica (such as Cab-O-Sil), wollastonite, dried silica gel, and bentonite. Non-siliceous metal oxides such as nickel oxide, aluminum oxide, natural and synthetic polymeric materials such as polyacrylamide, cellulose, polyacrylic acid, polyamino styrene, polysaccharides, polymethylacrylic acid, collagen, polygalacturonic acid, polyaspartic acid, L-alanine and L-glutamine copolymers, maleic anhydride and ethylene co-polymers, polyamide, ion exchange resins. Also carbon and platinum, are suitable carriers.

A wide variety of enzymes can be immobilized onto the substrates, using any of the known immobilizing techniques. The enzymes can be used either as a single variety of combinations of multiple varieties for specialized purposes. For instance, the enzymes suitably immobilized for use herein include a wide variety of enzymes which may be classified under three general headings: hydrolytic enzymes, redox enzymes, and transferase enzymes. The first group, hydrolytic enzymes, include proteolytic enzymes which hydrolyze proteins, e.g. papain, ficin, pepsin, trypsin, chymotrypsin, bromelin, keratinase; carbohydrases which hydrolyze carbohydrates, e.g. cellulase, amylase, maltase, pectinase, chitinase; esterases which hydrolyze esters, e.g. lipase, cholinesterase, lecithinase, alkaline and acid phosphatases; lysozyme; nucleases which hydrolyze nucleic acid, e.g. ribonuclease, desoxyribonuclease; and amidases which hydrolyze amines, e.g. arginase, aspariginase, glutaminase, and urease. The second group are redox enzymes that catalyze oxidation or reduction reactions. These include glucose oxidase, catalase, peroxidase, lipoxidase, and cytochrome reductase. In the third group are transferase enzymes that transfer groups from one molecule to another. Examples of these are glutamic-oxaloacetic transaminase, transmethylase, phosphopyruvic transphosphorylase.

In effecting a reaction wherein the substrate is in an aerosol form the aerosol containing the enzymatically treatable substrate is passed over the immobilized enzyme. The immobilized enzyme, as indicated above, may be in the form of a mesh screen, a fibrous pad, a membrane or sheet, honeycomb, particles or porous monolith. For instance, a tube may be filled with large particles and the aerosol forced through the tube whereby the particles of the aerosol are caused to pass over and around the immobilized enzyme particles thereby assuming intimate contact between the substrate and the immobilized enzymes. Suitably placed fans and/or baffles can be set into place to assure uniform or enhanced contact of the substrate with the immobilized enzymes.

The enzymatically active substrates which are catalytically acted upon by the enzymes fall into one of two categories: (1) pathogens which are inactivatable by the enzyme contact; and (2) reactants which can be enzymatically catalyzed.

The first catagory of pathogens includes the deleterious and harmful bacteria and viruses. The viruses include any RNA (ribonucleic acid) and DNA (deoxyribonucleic acid) viruses. To destroy a DNA containing virus, a deoxyribonuclease enzyme could be used in the immobilized form, and to destroy an RNA containing virus, a ribonuclease enzyme could be used. Specific viruses which are contemplated as inactivatable include adenovirus, poxvirus, reovirus, picornavirus, enterovirus, picornavirus rhinovirus, vaccinia, herpesvirus and hepatitus. One unique observation of this invention is that many viruses which have been shown to be inactivatable by contact of the virus with an immobilized enzyme in aqueous solution, have now been found to be inactivatable when the substrate is in the form of an aerosol. For instance, the enzyme ribonuclease has been found to inactivate London and Hong Kong A2 viruses in aerosol form, whereas the literature indicates that many influenza viruses are not inactivatable in aqueous solutions by ribonuclease.

Inactivatable bacteria include staphylococcus, streptococcus, pneumococcus, *E. coli*, pseudomonas or the like. Both gram positive and gram negative bacteria have been shown to be inactivatable by the techniques of this invention.

The pathogens are usually carried in aqueous droplets, sometimes containing other components such as mucus or the like. The droplet size is from 0.002-5 microns and preferably 0.01-1.5 microns.

The aerosol can be produced naturally such as is produced by human sneezing, coughing or even breathing, but may also be produced synthetically by a conventional atomizer.

In one system which can be used in enviroments which must be pathogen-free, such as in hospitals, biological research facilities or the like, the immobilized enzyme is formed into an open mesh structure. The structure is situated into the air intake of a sealed room, chamber, or similar compartment. An air outlet vent is provided in the sealed room, chamber or the like, and a means for drawing air out of the area is provided. Suitable such air evacuation units include air exhaust fans, vacuum suction pumps or the like. As the air is taken out, fresh air is drawn into the area through the immobilized enzyme. The enzyme is preselected so as to act on selected pathogens in the air. Contact of the fresh air over the enzymes thereby inactivates the selected pathogens, which are carried in the air in an aerosol phase, such that the room, chamber or the like is rendered substantially free of the selected pathogen. Of course, the original atmosphere in the room or chamber need not be replaced with fresh air, but the same effect can be attained by continuous recirculation of the air through the immobilized enzyme system.

In the second category, chemical synthesis can be effected on any aerosol chemical reactant which is susceptible to enzymatic reaction. Again one unique aspect of this invention is that enzymatic reactions which can be effected in a continuous liquid phase, can be effected at a more rapid rate when the substrate is in the aerosol form. Such reactions include oxidation-reduction reactions, group transfer, hydrolytic, addition, isomerization and condensation reactions.

The continuous phase of the aerosol can be any gas carrier, such as air, carbon dioxide, inert gases, oxygen, and organic chemical vapors or the like. The droplet size may be as above described, and the temperature range is as above described.

The temperature of the enzymatic reaction of the invention will vary of course over wide limits depending upon the particular enzyme or enzymes used and the particular substrate being acted upon. In general, suitable temperatures range from just above the freezing point of the aerosol to about 80°C and usually from about 4°C to 45°C. The upper temperatures are those at which the enzymes are heat inactivated.

The quantity of immobilized enzymes to enzymatically reactive substrates, of course is not critical since the enzymes act as catalysts for the reaction and in a continuous process will not be used up. The actual ratio to be used therefore is dependent on the systems used.

The contact time of the immobilized enzymes with the substrate is not critical. Suitable results are obtainable in time periods of from $10^{-1}$ to $10^4$ seconds, depending upon the particular materials and temperature.

Having now generally described the invention, a further understanding can be attained by reference to certain specific examples which are provided herein for purposes of illustration only and are not intended to be limiting unless otherwise so specified.

EXAMPLE 1

Unlike solution phase contact of viruses with the immobilized enzymes, inactivation of infectious viruses can be accomplished quite rapidly when the immobilized enzymes are used in an aerosol form.

Influenza virus is transmitted through the air in drops or droplet nuclei in the one micron size range. A reactor was prepared to handle virus containing infectious droplets directly rather than having to scrub the air and treat the resulting solution. A solution containing virus was atomized to micron size with an air stream and the resulting aerosol passed through a reactor.

The reactor was formed by attaching enzymes to ceramic monoliths which are currently manufactured as catalyst supports in automotive exhaust systems. They have straight-through pores approximately 1 mm on a side and a geometrical surface to volume ratio of about 30 cm²/cm³. Ribonuclease, trypsin and lysozyme were attached to these materials using a γ-aminopropyltriethoxy silane agent followed by glutaraldehyde fixation of the enzyme to the silane agent. Enzyme loadings were about 1.5 mg per gm. of ceramic based on disappearance of enzyme from solution.

The system was then tested for its effectiveness for influenza (Type A2 Hong Kong) disinfection. The results are presented in Table 1. The infectious virus concentration in the effluent from an active enzyme reactor to that from a blank reactor (heat denatured enzyme) treated in an identical fashion were compared. Differences between the two values were attributable to the effect of the active enzyme. RNase A at a 1 second residence time was found to destroy over 99 percent of the infectious particles entering the reactor. Sequential reactors, were also used, the first half having lysozyme or trypsin, while the second half contains immobilized RNase A, and the results are shown in Table I.

TABLE I

RESULTS OF AEROSOL PHASE STUDIES
INFLUENZA TYPE A2 HONG KONG

Room Temperature

| Enzyme system | Air residence time (sec.) | Percent Virus Removed | |
|---|---|---|---|
| | | Control** % | Reactor % |
| Trypsin (borine pancreatic) | 1.0 | 79 | 79 |
| Lysozyme | 0.4 | 97 | 97 |
| RNase A | 0.4 | 74 | 97.2 |
| RNase A | 1.0 | 78 | 99.3 |
| Trypsin/RNase A | 1.0 | 78.6 | 97.9 |
| Lysozyme/RNase A | 1.0 | 78.6 | 97.9 |

** reactor containing heat denatured enzyme

EXAMPLE 2

The system was then tested with the most recent influenza strain (Type A2 - London) which was prevalent in the U.S. in the winter of 1972–1973. The results are shown in Table II.

TABLE II

RESULTS OF AEROSOL PHASE STUDIES
INFLUENZA TYPE A2 - LONDON

Room Temperature

| Enzyme system | Air Residence time (sec.) | Percent Virus Removed | |
|---|---|---|---|
| | | Control** % | Reactor % |
| RNase A | 1.0 | 34 | 93.4 |
| Trypsin (borine Pancreatic) | 1.0 | 34 | 34 |

**reactor containing heat denatured enzyme

EXAMPLE 3

In another test of the system solution containing Herpes Simplex virus was atomized and passed through the reactors containing various immobilized enzymes. The results are shown in Table III.

TABLE III

RESULTS OF AEROSOL PHASE STUDIES HERPES SIMPLES-TYPE 1

Room Temperature

| Enzyme system | Air residence time (sec.) | Percent Virus Removed | |
|---|---|---|---|
| | | Control** % | Reactor % |
| Trypsin (bovine Pancreatic) | 1.0 | 33.5 | 99.99 |
| Protease | 1.0 | 33.5 | 79 |
| DNase A | 1.0 | 33.5 | 99.99 |

**Reactor containing heat denatured enzyme

EXAMPLE 4

In a further test of the system Coxsackie virus (A21) was atomized and passed through the reactor. The results are given in Table IV.

TABLE IV

RESULTS OF AEROSOL PHASE STUDIES COXSACKIE VIRUS

Room Temperature

| Enzyme system | Air residence time (sec.) | Percent Virus Removed | |
|---|---|---|---|
| | | Control** % | Reactor % |
| Trypsin (bovine pancreatic) | 1.0 | 79 | 97.8 |
| RNase A | 1.0 | 79 | 99.8 |

It can be seen from these tests that the nuclease (Ribonuclease or Deoxyribonuclease (beef pancreatic) corresponding to the nucleic acid of the virus (RNA or DNA) is the most effective enzyme for viral disinfection.

EXAMPLE 5

Example 1 was repeated with bacteria. The reactor was the same size and the same ceramic support was used. However, for this study, the enzyme immobilized on the support was lysozyme, since it destroys the mucopolysaccharides contained in the cell walls of bacteria.

The flow rates of a solution containing *E. coli* and air through the atomizer were the same as in the virus filter tests and the collection method was the same. Standard agar plating procedures were used to determine the bacteria count. A blank reactor removed approximately 30 percent of the bacteria fed to it and the results of the lysozyme-filter are listed in Table V. It can be seen that the enzyme filter is quite effective in disinfection of air-born *E. coli*.

TABLE V

DESTRUCTION OF E. COLI USING A LYSOZYME FILTER IN A VAPOR-PHASE SYSTEM

| Conc. of bacteria per ml. in inlet stream | Conc. of bacteria per ml. in exit stream |
|---|---|
| 12 | 1 |
| 116 | 1 |
| 157 | 1 |
| 364 | 1 |
| 889 | 1 |

The flow ratio used were the same as those used in Example 1.

In general, enzymatic reactions can be conducted on substrate in an aerosol form. As examples of this, the following tests were performed.

A 1 percent (by weight) ribonucleic acid solution was atomized and passed through a reactor consisting of RNase Immobilized on the ceramic monoliths. The results of steady state experiments are shown in Table VI.

Table VI.

AEROSOL FORM STEADY STATE RESULTS

Ribonucleic Acid - Ribonuclease system
Room Temperature

| Reactor | Liquid feed rate ml/min | Air flow rate l/min | Air residence time sec | Hydrolysis % |
|---|---|---|---|---|
| 1 | 2.2 | 8 | .4 | 5.7 |
| 2 | 2.2 | 8 | .4 | 3.4 |
| Blank** | 2.2 | 8 | .4 | 0.0 |

**support containing heat denatured ribonuclease

The results indicate that significant RNA hydrolysis occured in the active reactor while no hydrolysis was observed in the reactor containing heat-denatured RNase.

Comparative experiments to achieve the same percent hydrolysis as above when a 1 percent solution of ribonucleic acid is passed directly through the same reactor except in the form of a liquid requires a residence time of about 20 minutes as opposed to about 0.5 sec. –1 min. for the aerosol phase reactor. Thus, the observed reaction rate is at least a factor of some 20 greater in the aerosol reactors. Other studies were also done, especially to study the mechanism of the reactions, since the aerosol-form reaction rates appear to be much greater.

It is the usual procedure to express the reaction rate of an enzymatic system in terms of the Michaelis-Menten equation. This expression is given as:

$$\text{disappearance of substrate} = V_m S/K_m + S$$

The quantity $V_m$ is the maximum reaction velocity, and is directly proportional to the enzyme concentration. $K_m$ is the Michaelis constant and $S$ is the substrate concentration. The following results will be given in terms of $V_m$ and $K_m$ as being characteristic of the reaction.

In these tests trypsin was immobilized on porous ceramic monoliths in the manner described previously. The experiments were conducted either by passing a solution containing the substrate through the reactor or by atomizing the substrate solution and carrying it through the reactor with air. Table VII compares the Michaelis-Menten parameters for the trypsin catalyzed hydrolysis of BAEE (Benzoyl Arginine ethyl ester) when in solution and when atomized. Note that the same immobilized trypsin reactor was used for both tests. It can be immediately seen that the reaction rate is some 25 times faster than that occuring when the reaction is carried out on the same substrate in an aerosol form (compare $V_m$'s).

TABLE VII

STEADY STATE HYDROLYSIS OF BAEE
BY IMMOBILIZED TRYPSIN

Room Temperature

| Phase | $K_m$ <br> $M \times 10^{+4}$ | $V_m$ <br> M/min $\times 10^{+4}$ |
|---|---|---|
| Solution | 4.2 | 1.3 |
| Atomized | 6.3 | 35. |

The next experiment illustrates that an enhanced reaction occurs over a range of temperatures. Table VIII presents these results.

TABLE VIII

STEADY STATE HYDROLYSIS OF BAEE
BY IMMOBILIZED TRYPSIN AT 7 AND 25°C

| | Temperature °C | $K_m$ <br> $M \times 10^{+4}$ | $V_m$ <br> M/min $\times 10^{+4}$ | $K_m 25/K_m 7$ | $V_m 25/V_m 7$ |
|---|---|---|---|---|---|
| Atomized: | 25 | 5.1 | 42 | 1.2 | 2.1 |
| | 7 | 4.3 | 20 | | |
| Solution: | 25 | 4.2 | 1.5 | 2.8 | 3.3 |
| | 7 | 1.5 | 0.46 | | |

In a further experiment the hydrolysis of p-toluene sulfonyl-L-arginine methyl ester (TAME) by trypsin immobilized on ceramic was investigated. The results are shown in TABLE IX.

TABLE IX

STEADY STATE HYDROLYSIS OF TAME BY
IMMOBILIZED TRYPSIN

| Phase | Temperature | $K_m$ <br> $M \times 10^4$ | $V_m$ <br> M/min $\times 10^4$ |
|---|---|---|---|
| Solution | 25 | 21 | 5.5 |
| Atomized | 25 | 2.0 | 45 |
| Atomized | 7 | 3.3 | 34 |

These results indicate not only that the enzyme catalyzed chemical reactions can occur when the substrate is in an aerosol form but that they occur at greatly enhanced rates.

Obviously, many modifications and variations of the present invention are possible in light of the above teachings. It is to be understood therefore, that within the scope of the appended claims the present invention may be practiced otherwise than as specifically described herein.

What is claimed as new and desired to be secured by Letters Patent of the United States is:

1. A method for inactivating airborne virus or airborne bacterium which comprises contacting an aerosol containing said virus or bacterium with an immobilized hydrolytic enzyme wherein the particle size of said aerosol is from 0.002 to 5 microns, wherein said immobilized enzyme is attached to a solid support forming an enzyme reactor and wherein said inactivation is effected by passing said aerosol through said reactor.

2. The method of claim 1 wherein said aerosol contains an airborne virus in an aqueous droplet.

3. The method of claim 2 wherein said virus is selected from the group consisting of influenza, herpes and coxsacke.

4. The method of claim 3 wherein said immobilized enzyme is formed from an enzyme selected from the group consisting of ribonuclease, deoxyribonuclease, and trypsin.

5. The method of claim 1 wherein said pathogen is an airborne bacterium in an aqueous droplet.

6. The method of claim 5 wherein said bacterium is staphylococcus, streptococcus, and pneumococcus.

7. The method of claim 6 wherein said immobilized enzyme is formed from the group consisting of Lysozyme, ribonuclease and deoxyribonuclease.

8. The method of claim 1 wherein the period of contact of said aerosol with said immobilized enzyme is from $10^{-1}$ to $10^4$ seconds.

9. The method of claim 1 wherein the carrier for said immobilized enzyme is ceramic.

* * * * *

UNITED STATES PATENT OFFICE
CERTIFICATE OF CORRECTION

PATENT NO. : 3,849,254
DATED : November 19, 1974
INVENTOR(S) : DONALD J. KIRWIN AND JOHN L. GAINER It is certified that error appears in the above-identified patent and that said Letters Patent are hereby corrected as shown below:

COLUMN 2, LINE 44, insert the following paragraph:

--The invention described herein was made in tle course of or under a grant from the National Science Foundation, an agency of the United States Government.--

Signed and Sealed this twenty-eight Day of October 1975

[SEAL]

Attest:

RUTH C. MASON
Attesting Officer

C. MARSHALL DANN
Commissioner of Patents and Trademarks